United States Patent [19]
Magee, Jr.

[11] 3,977,603
[45] Aug. 31, 1976

[54] FLUID DELIVERY SYSTEM

[75] Inventor: Hubert E. Magee, Jr., Houston, Tex.

[73] Assignee: Partek Corporation of Houston, Houston, Tex.

[22] Filed: Oct. 22, 1975

[21] Appl. No.: 624,913

[52] U.S. Cl. ............................... 239/76; 239/332; 239/446; 137/110
[51] Int. Cl.² ................ F16K 21/00; B05B 15/00; B05B 9/00
[58] Field of Search ............... 239/124, 11, 61, 76, 239/93, 329, 330, 571, 443–446, 127, 332, 570, 583; 137/110, 513.3, 599, 612.1

[56] References Cited
UNITED STATES PATENTS

| | | | |
|---|---|---|---|
| 2,566,734 | 9/1951 | Lawrence et al. | 239/127 |
| 2,599,680 | 6/1952 | Weeks | 239/332 X |
| 2,692,797 | 10/1954 | Wood et al. | 239/76 |
| 2,790,678 | 4/1957 | Arant | 239/446 X |
| 2,995,141 | 8/1961 | Hipp | 137/110 X |
| 3,122,162 | 2/1964 | Sands | 137/513.3 X |
| 3,147,767 | 9/1964 | Goss | 239/127 X |
| 3,375,980 | 4/1968 | Hinrichs | 239/411 |
| 3,692,214 | 9/1972 | Liedberg et al. | 239/332 X |
| 3,831,845 | 8/1974 | Pacht | 239/76 |
| 3,834,621 | 9/1974 | Pacht et al. | 239/76 |

Primary Examiner—Robert S. Ward, Jr.
Attorney, Agent, or Firm—Hubbard, Thurman, Turner & Tucker

[57] ABSTRACT

A high pressure fluid delivery system is disclosed in which two or more dump guns, each having a high pressure nozzle outlet and a low pressure dump outlet, may be connected to and operated from a single high pressure pump. Pressure responsive flow control apparatus is provided in the flow line between each gun and the pump to maintain a substantially constant load on the pump even though the dump guns are randomly operated. A motor control apparatus is also provided for controlling the speed of an engine driving the pump and this apparatus is connected to the pressure responsive control apparatus through a shuttle valve so that the engine idles when all of the guns are dumping, but automatically runs at a faster speed when one or more of the dump guns is actuated to provide a high pressure fluid blast.

12 Claims, 4 Drawing Figures

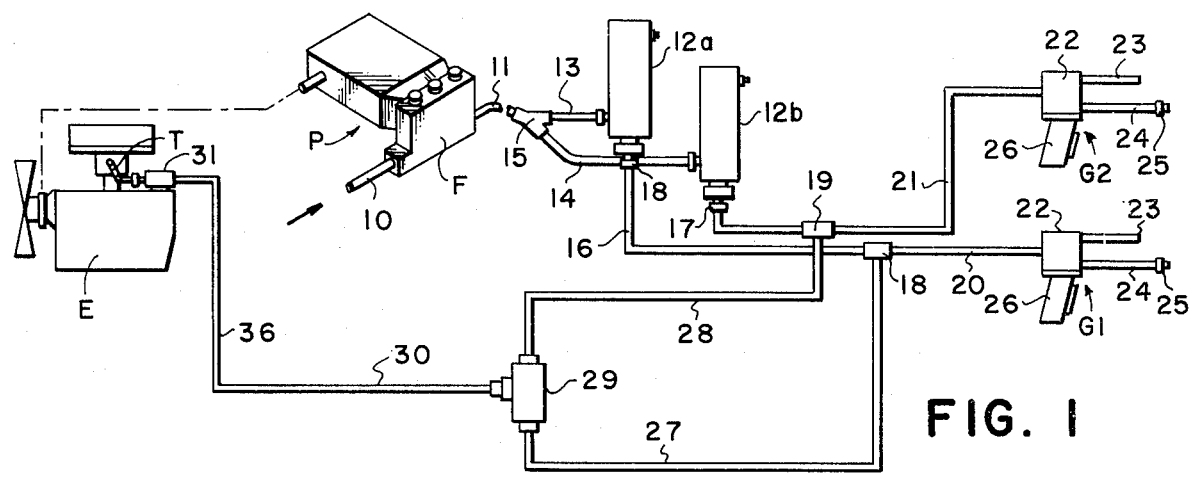

FLUID DELIVERY SYSTEM

This invention relates to a high pressure fluid delivery system for cleaning and other applications, and in one of its aspects, to such a system in which a single pump is utilized to furnish high pressure fluid to one or more randomly operated dump guns.

In the prior art, fluid systems are provided in which a high pressure stream of water, i.e., at pressures of 3,000 to 20,000 pounds per inch or more, are used for many cleaning applications. In many of these systems a hand held nozzle and valve assembly (somewhat like a gun with a nozzle at the end of the barrel and called a dump gun) is provided and is connected by a hose to the outlet of a high pressure pump. The dump gun generally includes a valve housing, a barrel extension for directing a stream of water through the nozzle to the object to be cleaned, a handle-trigger mechanism or other triggering device, and a pressure relief or dump outlet for relieving pressures in the valve housing when flow through the high pressure nozzle is interrupted. An example of this type of apparatus is illustrated in U.S. Pat. No. 3,765,607, assigned to the assignee of this invention.

Many times it is desirable in such a system to randomly utilize two or more dump guns which are supplied fluid, such as water, at high pressure by a single pump. When the gun is dumping water, pressures are generally no more than a few hundred pounds, but when the dump outlet of the gun is closed, the pressure at the outlet of the pump may exceed 10,000 psi.

Because of the wide differential between water pressures when water is dumped and when it is being discharged through the gun nozzle, apparatus have been suggested for automatically decreasing the pump engine speed during dumping, such as shown in U.S. Pat. No. 3,335,962, in order to reduce maintenance on both the engine and pump. However, prior to this invention where two or more nozzle guns are employed in random operation, such apparatus has not been practical. Also, when two or more guns are randomly operated from a single source, it is further desirable that a constant load on the pump and a constant inlet pressure to the guns be provided independent of the operation of the guns, such as provided by the apparatus disclosed in U.S. Pat. Nos. 3,834,621 and 3,831,845, both assigned to the assignee of this invention.

The primary object of this invention is to provide a fluid delivery system utilizing a single pump to provide high pressure fluid to two or more dump guns, and in which both (i) the engine speed of an engine driving the pump may be automatically decreased when all guns are dumping, and automatically maintained at a relatively high speed when one or more guns are providing a high pressure fluid blast, and (ii) the load on the pump is maintained substantially constant independent of the operation of the various guns or the engine speed.

Another object of this invention is to provide such a system in which a plurality of dump guns with different size nozzle openings can be used at the same time, and the nozzle sizes of each gun can be easily changed without affecting the operation of the system.

Another object of this invention is to provide such a system in which different flow rates from the pump, or from different pumps used with the system, can be compensated for without substantially altering the system.

Another object of this invention is to provide such a system which is relatively simple yet effective to meet the objects of this invention.

These and other objects of this invention, which will become apparent upon consideration of the appended drawings and claims, and the detailed description of the drawings to follow, are accomplished in accordance with this invention by providing a fluid delivery system which includes a prime mover having a throttle speed control and connected to drive a pump which supplies fluid at high pressure, i.e., from 3,000 to 20,000 psi. A plurality of dump guns which may be randomly operated are connected through one or more pressure control apparatus to the outlet of the pump and the pressure control apparatus operates to maintain a substantially constant load on the pump during random operation of the dump guns. A throttle control apparatus is connected to the throttle of the prime mover and responds to a control signal, which in the preferred embodiment of this invention illustrated is a fluid pressure signal, to vary the position of the throttle and control the speed of operation of the prime mover. In order to provide this control signal in the illustrated preferred embodiment of this invention, means is connected between the throttle control apparatus and a point between the outlet of the pump and the inlet of the dump guns to be responsive to actuation of the guns to provide the control signal. In the illustrated embodiment of this invention, this means is provided by a shuttle valve connected to the fluid inlets of each dump gun and to the throttle control apparatus and providing a variable fluid pressure signal in response to actuation of the dump guns so that the prime mover runs at a relatively slow speed when all of the guns are dumping, and at a relatively fast speed when at least one of the guns is actuated to provide a stream of high pressure fluid.

In the drawings, wherein preferred embodiments of this invention are illustrated and like figure numbers are used throughout to designate like parts:

FIG. 1 is a view in elevation illustrating the fluid delivery system of this invention connected to provide a high-pressure, fluid blast from two dump guns;

FIG. 2 is a detailed sectional view of the shuttle valve of the system of FIG. 1;

FIG. 3 is a detailed sectional view of the throttle control apparatus utilized in the system of FIG. 1; and FIG. 4 illustrates the system of FIG. 1 modified to provide for a high-pressure fluid blast from three dump guns connected to the system for random operation.

Referring now to FIG. 1, a high-pressure fluid pump P is illustrated as including a fluid end F connected through an inlet 10 to a source of water (not shown), and an outlet 11. Pump P is drivingly connected by suitable apparatus such as an endless belt indicated by dotted line B to a prime mover E, which in the embodiment illustrated is an internal combustion engine having a throttle T for controlling its speed and therefore the speed of operation of pump P.

Two pressure control apparatus 12a and 12b are also provided in the embodiment illustrated in FIG. 1 for maintaining a constant load at the outlet of pump P even during random operation of the dump guns connected to the system. Each pressure control apparatus 12a and 12b may be the same or similar to the pressure control apparatus described in either of U.S. Pat. Nos. 3,831,845 and 3,834,621, assigned to the assignee of this invention and the disclosures of those patents are incorporated herein by reference. The pressure control apparatus described in each of the referenced patents function to provide uninterrupted flow of fluid from the pump to a nozzle orifice in the dump gun connected thereto when the gun is actuated to close the dump valve. However, when the gun is dumping, the fluid flow is automatically passed through a restricted opening in the pressure control apparatus which simulates the effect of flow through the high pressure nozzle opening of the gun, thereby providing a constant load to the pump whether the gun is dumping or not.

Each of pressure control apparatus 12a and 12b is connected respectively through inlet conduits 13 and 14 and a Y connection 15 to outlet conduit 11 of pump P, or each may be connected through a common manifold (not shown) to the outlet of pump P. The fluid outlets of pressure control apparatus 12a and 12b are connected respectively through conduits 16 and 17 to flow through tee connectors 18 and 19 which are in turn connected through conduits 20 and 21 to the inlets of dump guns G1 and G2 respectively.

As illustrated in FIG. 1, each dump gun G1 and G2 includes a valve housing 22, a low pressure dump outlet 23, a high pressure fluid blast outlet 24 including a removable nozzle 25, and a handle mechanism 26 including means for actuating the valve mechanism of the gun to divert flow between dump outlet 23 and nozzle outlet 25. As also illustrated in FIG. 1, tee connectors 18 and 19 are respectively connected through conduits 27 and 28 to, and in fluid communication with, a shuttle valve 29, the details of which are illustrated in FIG. 2. The outlet of shuttle valve 29 is connected through conduit 30 to the inlet of a throttle control apparatus 31 mounted on engine E to operate throttle T. The details of throttle control apparatus 31 are illustrated in FIG. 3.

Thus, when gun G1 is dumping fluid at a relatively low pressure, pressure in conduit 20 is relatively low, and when gun G1 is actuated to provide a high pressure fluid blast, the pressure in conduit 20 is relatively high. The same is true with respect to conduit 21 connected to the inlet of gun G2 and conduits 21 and 28. Thus, the inlets of shuttle valve 29 are either at a high pressure when the gun connected thereto is providing a high pressure fluid blast or at a relatively low pressure when the gun is dumping. As illustrated in FIG. 2, a preferred form of shuttle valve 29 includes inlets 32 and 33 respectively connected to conduits 27 and 28 and outlet 34 connected to conduit 30. A ball shuttle valve member 35 is provided in a passageway 36 connecting the respective inlets and outlet and valve seats 37 and 38 are provided adjacent the respective inlets 32 and 33 so that each of the inlets can be sealed by valve member 35 as it moves to one side or the other of passageway 36. The opening in outlet 34 is larger in diameter than ball valve member 35 so that it is not sealed by the valve member, and a rib 34a in the opening in outlet 34 prevents the ball from passing into it. Thus, if the pressure on inlet 32 side of the shuttle valve is higher than the pressure on the inlet 33 side, ball valve member 35 will seat against seat 38 (as shown) permitting the higher pressure fluid in conduit 27 to pass through outlet 34 into conduit 30 to actuate throttle control apparatus 31. On the other hand, if the fluid pressure on the inlet 33 side of the shuttle valve is higher than the fluid pressure on the inlet 32 side, ball valve member 35 will seat against valve seat 37 and permit the higher pressure on the inlet 33 side to pass through outlet 34 to conduit 30. Thus, the higher fluid pressure at inlets 32 and 33 will pass through the valve outlet 34 to conduit 30 or if the pressures are the same, fluid at that same pressure would appear at outlet 34.

Thus, in the case where one of guns G1 or G2 is dumping at a relatively low pressure and the other gun is providing a high pressure fluid blast, pressure at one of inlets 32 and 33 will be higher than the pressure at the other inlet, forcing valve member 35 against the seat of the lower pressure inlet and permitting the high pressure to pass through outlet 34 to throttle control valve 31. As is hereinafter explained with respect to FIG. 3, when this occurs, the engine throttle is caused by throttle control apparatus 31 to open sufficiently to provide a relatively high engine speed to drive pump P as the load demand on the pump would be relatively high in this condition. In the case where both guns G1 and G2 are actuated to provide a high pressure fluid blast, relatively high pressures would be provided at each of inlets 32 and 33, and this high pressure would be discharged through outlet 34 and conduit 30 to actuate throttle control apparatus 31 to the high speed position described. However, in the event that both guns G1 and G2 are dumping at a relatively low pressure, so that low pressure fluid would be applied through inlets 32 and 33 on either side of valve member 35, fluid at the relatively low fluid pressure will pass through outlet 34 to conduit 30 to actuate throttle control apparatus 31. In this case, it is further explained with respect to FIG. 3, throttle control apparatus 31 is actuated by a spring force which overcomes the relatively low fluid pressure in conduit 30 to move to a second position closing throttle T sufficiently to slow the engine down to an idle speed, thus driving pump P at a slower speed when demand on the pump is less.

Referring now to FIG. 3, a preferred form of throttle control apparatus 31 is illustrated as including a housing 40, having a main piston chamber 41 therein and a smaller center bore 42 connected to inlet 43 to which conduit 30 may be connected for conducting fluid pressure to the apparatus. A main piston 44 is mounted in chamber 41 and a coil spring 45 is mounted between piston 41 and a cap 46 closing the end of chamber 41 opposite that to inlet 43. Spring 45 urges piston 44 towards inlet 43. A slot is provided in housing 40 and an actuator rod 47 extends from piston 44 through the slot and is connected to a throttle control rod 48 which is in turn connected to operate throttle T between its respective positions. In the position illustrated by solid lines in FIG. 3, wherein piston 44 is urged against the end of chamber 41 adjacent inlet 43, throttle T of engine E would be adjusted to cause the engine to run at a relatively low speed.

A second, smaller piston 50, which functions as a push rod for larger piston 44, is mounted in bore 42 so that one end of piston 50 abuts an end of piston 41 and the other end extends into inlet 43 to be exposed to pressure from conduit 30. An O ring or other suitable seal 51 is provided about the end of piston 50 adjacent inlet 43 to seal pressure from inlet 30. Thus, when the fluid pressure in inlet 30 is sufficient, taking into account the area of piston 50 exposed thereto, to overcome the force of spring 45 urging against piston 41, pistons 50 and 44 are urged towards cap 46, thus moving throttle control rod 48 towards the dotted line position of FIG. 3 increasing the speed of engine E as required.

Of course, other forms of a throttle control apparatus may be utilized with this invention. For example, change in fluid pressure in conduit 30 may be utilized to actuate a hydro-electric switch mechanism which in turn would supply electric power to actuate a solenoid connected to throttle T for changing the position of throttle T. Also, if prime mover E is an electric motor, the control apparatus can be used to control the motor speed control on the motor.

Referring now to FIG. 4, an embodiment of this invention is illustrated in which three dump guns G3, G4, and G5 are connected in the fluid delivery system for random operation. The principles utilized in the illustrated embodiment can be employed to expand the present system to provide controlled fluid delivery to a greater number of dump guns. Except as explained below it is assumed that the system of FIG. 4 is identical to that of FIG. 1 but with one dump gun added. As illustrated in FIG. 4, the inlet conduits 100 and 101 to guns G3 and G4 are connected through suitable tee connectors 102 and 103 to the inlets of shuttle valve 104 which may be identical to shuttle valve 29 previously described, and shuttle valve 104 is connected at its outlet to a conduit 105. Conduit 105 is in turn connected to an inlet of a second shuttle valve 106 which also may be identical to shuttle valves 104 and 29. The inlet conduit 107 of gun G4 is connected through a tee connector 108 to the other inlet of shuttle valve 106 and the outlet of shuttle valve 106 is connected through a conduit 109 to throttle control apparatus 31. Thus, when the pressure is high in either of inlet conduits 100 or 101, and at least one of those guns is actuated to provide a high pressure fluid blast, the pressure at the outlet of shuttle valve 104 and thus at one inlet of shuttle valve 106 is relatively high, insuring a relatively high pressure in conduit 109 to operate throttle control apparatus 31. Also, if gun G5 is actuated to provide a high pressure fluid blast, the pressure on the other inlet of shuttle valve 106 will also be relatively high. It is only when all guns are dumping and the pressure at all of the inlets of both shuttle valves 104 and 106 is relatively low that the fluid pressure in conduit 109 will be relatively low permitting engine E to run at its idle or slower speed setting.

Thus, as is apparent from the above description, a fluid delivery system is provided which permits random operation of a plurality of high pressure dump guns from a single pump while automatically maintaining a substantially constant load and outlet pressure at the pump and while also automatically operating the pump and prime mover driving it at a relatively slow or idle speed until demand requires a higher speed of operation. Thus, the wear and tear on the pump and engine associated with the relatively high pressures employed in the delivery system of this invention are reduced and reliability of the system increased. In addition, fuel is saved as the engine can idle during low demand periods.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for supplying a high pressure stream of fluid comprising:
  a pump having a low pressure inlet adapted to be connected to a source of fluid and a high pressure outlet;
  a prime mover drivingly connected to said pump and including a throttle for controlling the speed of operation of said pump;
  throttle control means connected to said throttle and adapted to respond to a control signal to move said throttle to vary the speed of said prime mover between a relatively fast speed and a relatively slow speed;
  at least two dump guns each including a fluid inlet, a relatively high pressure fluid outlet, a relatively low pressure fluid outlet, and actuating means for diverting flow between the fluid outlets of said guns;
  flow control means connected between the inlet of each gun and the outlet of said pump for maintaining a substantially constant load on said pump during random actuation of said actuating means; and
  means connected between said flow control means and said throttle control means for providing said control signal in response to actuation of at least one of said guns.

2. The system of claim 1 wherein said control signal is a change in fluid pressure and said throttle control means responds to a change in said fluid pressure to control said throttle.

3. The system of claim 1 wherein said last mentioned means is a shuttle valve connected between said flow control means and said guns for providing a variable fluid pressure control signal in response to actuation of said guns.

4. The system of claim 3 wherein said throttle control means is responsive to said variable fluid pressure signal to move said throttle between one position at which the pump is driven at a relatively high speed when at least one gun is actuated to provide a high pressure fluid blast, and another position at which the pump is driven at a relatively low speed when all of the guns are dumping.

5. The system of claim 1 wherein said throttle control means is responsive to a change in pressure to cause said prime mover to change speeds, said flow control means is responsive to actuation of the gun connected thereto to provide substantially the same restriction to flow of fluid from the outlet of said pump irrespective of the position of said actuating means, and said last mentioned means is a shuttle valve that responds to the fluid pressure to each of said guns to provide a variable pressure control signal to said throttle control means.

6. The system of claim 1 wherein at least three dump guns are connected to the system for random operation and said last mentioned means includes at least two shuttle valves connected to respond to the actuation of said guns to provide said control signal.

7. Apparatus for controlling the speed of operation of a pump driven by a prime mover wherein the pump is adapted to supply fluid to a plurality of randomly operated dump guns, comprising:

first means connected between said pump and said guns for providing a substantially constant load on said pump during random operation of said guns; and second means connected to said prime mover for varying the speed of operation thereof in response to operation of said guns whereby the pump is driven at a relatively high speed when load demand is relatively high, and a relatively slow speed of operation when load demand is relatively low.

8. The apparatus of claim 7 wherein said first means includes a pressure control apparatus connected between the pump and each gun to provide substantially the same load on the pump when the gun connected thereto is dumping or providing a stream of high pressure fluid.

9. The apparatus of claim 7 wherein said prime mover includes a throttle and said second means includes a throttle control means connected to vary the position of said throttle in response to a control signal, and means connected to said throttle control means and said first means for providing said control signal.

10. The apparatus of claim 8 wherein said prime mover includes a throttle and said second means includes a throttle control means connected to vary the position of said throttle in response to a control signal, and means connected to said throttle control means and said first means for providing said control signal.

11. The apparatus of claim 9 wherein said last mentioned means is a shuttle valve.

12. The apparatus of claim 10 wherein said last mentioned means is a shuttle valve.

* * * * *